3,318,925
METHYLATED ESTRONES
Georg Anner and Jaroslav Kalvoda, Basel, and Peter Wieland, Oberwil, Basel-Land, Switzerland, assignors to Ciba Corporation, New York, N.Y., a corporation of Delaware
No Drawing. Filed Dec. 21, 1964, Ser. No. 420,146
Claims priority, application Switzerland, Dec. 24, 1963, 15,945/63; May 27, 1964, 6,914/64; Dec. 3, 1964, 15,654/64
2 Claims. (Cl. 260—397.4)

This invention relates to the manufacture of the 7α-methyl-estrone of the formula

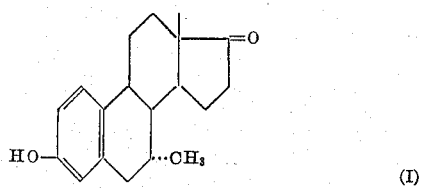

and its 3-methyl ether. These compounds are highly active estrogenically. In the castrated female rat, the 7α-methyl estrone, when administered subcutaneously in the Allen-Doisy test (keratinization of the vagina), has three times the estrogenic action of estrone, and in the Bülbring-Burn test (growth of uterus) it has twice the estrogenic action of estrone. On oral administration of 7α-methyl estrone through a stomach tube to the castrated female rat in the Allen-Doisy test, a three times higher intensity of the estrogenic effect is observed than with estrone. The new compounds can therefore be used as highly active estrogens.

The new compounds can be prepared in per se conventional manner, especially by aromatization of the ring A in a compound of the formula

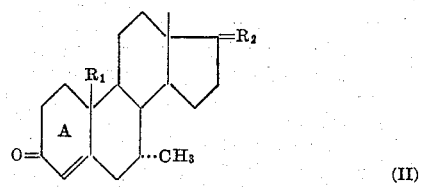

in which $R_1$ represents hydrogen, a free or esterified hydroxyl group or a methyl or hydroxymethyl group, and $R_2$ an oxo group or a substituent convertible thereinto, e.g. an oxygenated substituent, e.g. a free or functionally converted hydroxy group together with a hydrogen atom, or a functionally converted oxo group, and which compounds may contain another double bond in 1,2-position, and, if desired, by conversion of the 17-substituent into a free oxo group and/or the 3-hydroxy group into a 3-methoxy group. Thus, for example, a 19-unsubstituted $\Delta^{1,4}$-3-oxo-7α-methyl-androstadiene of the above Formula II can be aromatized in ring A by pyrolysis. To this end, said starting material is heated in the presence or absence of a solvent or diluent, e.g. a mineral oil or a cyclic hydrocarbon, such as 9,10-dihydrophenanthrene, for example to 200–600° C. Another method of aromatization consists in treating said 19-unsubstituted $\Delta^{1,4}$-3-oxo-7α-methyl-androstadiene with lithium and diphenyl in the presence of diphenyl methane as described in Journal of the American Chemical Society, 86, 742 (1964). Tetrahydrofuran is the preferred solvent used.

After aromatization, e.g. an oxygenated group in 17-position may be converted in conventional manner into the free oxo group, and/or, if desired, the 3-hydroxy group into a 3-methoxy group.

The new compounds can also be obtained by pyrolysis of a $\Delta^4$-3-oxo-7α-methyl-10-acyloxy-19-nor-androstene of the above Formula II and, if necessary, conversion of the 17-substituent into a free oxo group and/or of the 3-hydroxy group into the methoxy group. In these starting materials, the acyloxy group is especially the acyloxy group of a carboxylic acid, e.g. of a lower aliphatic or aromatic carboxylic acid, e.g. acetic, trifluoracetic or benzoic acid. According to this invention, the 10-acyloxy group is eliminated by heating the starting material, advantageously to a temperature above 80° C., preferably under reduced pressure, or by heating it for a short while in a high-boiling solvent or diluent, especially a hydrocarbon or ether, such as toluene, xylene, tetraline, decalin, dioxane, anisol or diethylene glycol dimethyl ether.

The new compounds can also be obtained by treating a $\Delta^{1,4}$-3-oxo-7α-methyl-19-hydroxy-androstadiene of the above formula II with an acid or a base, and, if desired, converting the substituent in 17-position into a free oxo group and/or the 3-hydroxy group into the methoxy group. As acids there are advantageously used mineral acids, such as hydrochloric acid, sulfuric acid or chlorosulfonic acid, or carboxylic acids, such as formic, acetic, or propionic acid, and as bases, e.g. alkali metal hydroxides, such as sodium or potassium hydroxide, or nitrogen bases, such as pyridine or dimethyl formamide. If one of the acid or basic agents mentioned is used that does not dissolve the starting material, the reaction is advantageously performed in a solvent, for example in a hydrocarbon, alcohol, ether or ketone, such as benzene, xylene, methanol, ethanol, dioxane or acetone.

Starting from compounds of the above Formula II in which $R_1$ is a hydrogen atom the 7α-methyl-estrone can be prepared by treating the starting materials with dehydrogenating agents, preferably such as are capable of introducing a double bond in 1,2-position or in 1,2- and 4,5-position of 10-methyl steroids. These agents may be quinones, especially 2,3-dichloro-5,6-dicyanbenzoquinone or chloranil, or selenious acid and its derivatives, such as selenium dioxide or dibenzoyloxy selenium oxide. This dehydrogenation is performed in the usual manner, e.g. in a solvent, advantageously an ether or alcohol, such as dioxane, tetrahydrofuran, ethanol, or tertiary butanol, and advantageously at an elevated temperature. Alternatively, the starting materials mentioned may be treated with micro-organisms capable of introducing a double bond in 1,2-position of a steroid, e.g. Corynebacterium simplex, Didymella lycopersici, Bacillus subtilis, or Septomyxa affinis. If necessary, the 17-substituent is then converted into a free oxo group, and/or the 3-hydroxy group into the methoxy group.

Another method of producing the new compounds of this invention consists in causing an acid to act on a 17-substituted $\Delta^4$-3-oxo-6β - halogen - 7α - methyl - 19 - nor-androstene of the formula

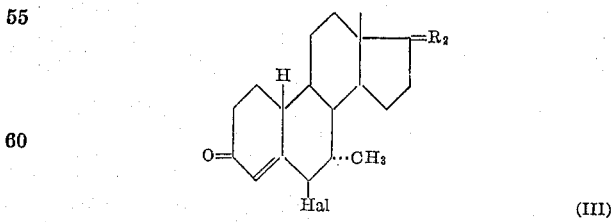

in which $R_2$ has the meaning given above, and Hal stands for halogen, especially bromine, and if desired or required converting the 17-substituent into a free oxo group, and/or the 3-hydroxy group into a 3-methoxy group. It is of advantage to use strong acids, especially mineral acids, e.g. those mentioned above. This reaction can be performed in one of the aforementioned solvents. Particularly favorable results are obtained when the reaction is performed with hydrochloric acid in acetone.

Furthermore, the new compounds can be prepared from a Δ$^{1,4,9(11)}$-3oxo-7α-methyl-androstatriene of the formula

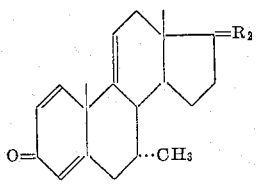

(IV)

in which $R_2$ has the meaning given above, by treatment with zinc and hydrogenation of the Δ$^{1,3,5(10)9(11)}$-3-hydroxy-7α-methyl-estratetraene formed and optional conversion of the substituent $R_2$ into the free oxo group, and/or the 3-hydroxy group into the 3-methoxy group. Alternatively, hydrogenation may follow the last-mentioned conversions. The treatment with zinc is advantageously performed in aqueous pyridine, e.g. pyridine+water (9:1) or an alkanol or glycol, such as ethanol or ethylene glycol. For the hydrogenation it is of advantage to use catalytically activated or nascent hydrogen, e.g. hydrogen and palladium catalysts or sodium or potassium in liquid ammonia.

Finally, the new compounds can also be prepared by the following new method which permits of the stereospecific introduction of the 7α-methyl group. It consists in reacting the 6,7β-epoxide of a 3,17-disubstituted Δ$^{1,3,5(10)}$-estratriene of the formula

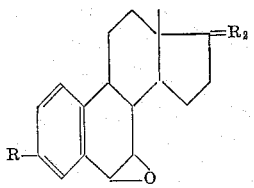

in which R represents a free or functionally converted, e.g. esterified or etherified, hydroxy group, and $R_2$ has the meaning given above, with a methyl metal compound, e.g. a methyl magnesium halide, especially methyl magnesium bromide or iodide, or with lithium methyl, eliminating the hydroxy group from the resulting 6-hydroxy-7α-methyl compound, if desired, after esterification of the latter, and, if desired, converting the group in 17-position into a free oxo group and/or the free 3-hydroxy group into the methoxy group, or a functionally converted 3-hydroxy group into a free hydroxy group and if desired or required into the methoxy group in per se conventional manner. This reaction with the methyl magnesium halide is advantageously performed in an ether, such as diethyl ether, tetra-hydrofuran or dioxan, or an aromatic hydrocarbon, such as benzene. The hydrogenolytic elimination of the hydroxy group from the 6-hydroxy-7α-methyl compound is advantageously performed with catalytically activated or nascent hydrogen. The 6-hydroxy group may also be esterified, for example, with a reactive, functional derivative of a carboxylic or sulfonic acid, e.g. one of those mentioned above, and then split off hydrogenolytically, e.g. with Raney nickel.

A functionally converted hydroxy group in 3- or 17-position in the aforementioned starting materials is, for example, a hydroxy group esterified with an organic carboxylic acid or sulfonic acid, especially one having at most 20 carbon atoms, e.g. formic, acetic, propionic, butyric, valeric, caproic, trimethylacetic, undecylenic, cyclopropylcarboxylic, cyclopentylcarboxylic, cyclohexylacetic, phenylacetic, phenylpropionic, phenoxyacetic, acetoacetic, diethylaminoacetic, glycollic, bisglycollic, asparaginic, benzoic, ortho-sulfobenzoic, furan-2-carboxylic, or nicotinic acid, or methane, ethane, benzene, or toluene sulfonic acid, or a hydroxy group etherified with a lower aliphatic alcohol, such as methyl or ethyl alcohol, an araliphatic alcohol, such as benzyl alcohol, or a heterocyclic alcohol, such as tetrahydropyranol; a functionally converted oxo group is, for example, a ketalized oxo group, an oxime or hydrazone group.

The conversion of a 17-oxygenated substituent into the free oxo group in all of the above methods follows the known pattern. Thus, an esterified or etherified hydroxy group, can be split e.g. hydrolytically or hydrogenolytically, and a free hydroxy group can be dehydrogenated by oxidation, if desired, after prior functional conversion, e.g. esterification or etherification of the 3-hydroxy group, to form the oxo group. A suitable oxidant is, as is known, for example, chromic acid, or the Oppenauer method is employed with an aluminum alcoholate in the presence of a ketone in solution in benzene. A ketalized oxo group can be liberated, for example, by acid hydrolysis. Likewise, a functionally converted, e.g. esterified or etherified, hydroxy group in 3-position of the resulting 7α-methylestrone derivatives can be converted in per se conventional manner into the free hydroxy group. The etherification of the 3-hydroxy group of the 7α-methyl estrone can also be performed in known manner, e.g. by treatment with a methyl halide or dimethyl sulfate, or with diazomethane.

The greater part of the starting materials are known. New starting materials can be prepared by known methods. The Δ$^4$-3-oxo-7α-methyl compounds of the androstane or 19-nor-androstane series of the above Formulae II, III and IV, for example, can be prepared from the corresponding 7-unsubstituted Δ$^{4,6}$-3-oxo-androstadienes or 19-nor-androstadienes by treatment with methyl magnesium iodide in the presence of copper-I-chloride or copper-II-acetate, followed by hydrolysis. The resulting products can be dehydrogenated in 1,2-position, with selenium dioxide or quinones, especially 2,3-dichloro-5,6-dicyanobenzoquinone, in alcohols, such as tertiary butanol or tertiary pentanol, or with enzymes of fungi of the genus Fusarium, Didymella, Corynebacterium or *Bacillus subtilis* or *sphaericus*, or they can be hydroxylated in 19-position, if desired, before or after dehydrogenation, with enzymes of fungi of the genus Corticium or Pericularia. Δ$^4$-3-oxo-7α-methyl-10-acyloxy-19-nor-androstenes can be prepared by reacting Δ$^4$-3-oxo-7α-methyl-19-hydroxy-androstenes with lead tetraacylates, especially lead tetraacetate, in non-polar solvents, such as benzene or cyclohexane. Δ$^4$ - 3 - oxo-6β-halogen-7α-methyl-19-nor-androstenes can be obtained from 3-enol ethers of said Δ$^4$-3-oxo-7α-methyl-19-nor-androstenes by reacting them with N-halogen-carboxylic acid amides or imides, such as N-bromo-acetamide or N-bromo-succinimide.

The 6,7β-epoxides of the Formula V used in the new process can be obtained from the corresponding Δ$^{1,3,5(10),6}$-estratetraenes by reaction with N halogen-carboxylic acid amides or imides, e.g. those mentioned above, and treatment of the resulting 6,7-halohydrins with alkalis, advantageously with potassium hydroxide in aqueous dioxane. Any oxo groups present in the starting materials may, if desired, be ketalized in known manner, for example, with lower alkanols or glycols, such as methanol or ethylene glycol.

The new compounds can be used as medicaments in the form of pharmaceutical preparations containing them in admixture or conjunction with a pharmaceutical, organic or inorganic, solid or liquid carrier suitable for enteral, e.g. oral, or parenteral administration. Suitable carriers are substances that do not react with the new compounds, for example, water, gelatine, lactose, starches, magnesium stearate, talcum, vegetable oils, benzyl alcohols, gums, polyalkylene glycols, cholesterol or other known medicinal carriers. The pharmaceutical preparations may be, for example, tablets, dragées or capsules, or in liquid form solutions, suspensions or emulsions. They may be sterilized and/or may contain assistants such as preserving, stabilizing, wetting or emulsifying agents, salts for regulating the osmotic pressure or buffers. They may additionally contain other therapeutically valuable substances.

The pharmaceutical preparations of the present invention preferably contain the active estrogenic substances manufactured in a dose range of 0.005 mg. to 1 mg.

The following examples illustrate the invention. per unit dose.

EXAMPLE 1

A solution of 5.00 g. of $\Delta^4$-3-oxo-7α-methyl-17β-acetoxy-19-nor-androstene in 250 ml. of dioxane, after the addition of 10 g. of 2,3-dichloro-5,6-dicyanobenzoquinone, is refluxed for 14 hours, and the reaction mixture, after being cooled, is filtered and evaporated under reduced pressure. The residue is dissolved in benzene, and the resulting solution filtered through 250 g. of anhydrous silica gel. With a 9:1 mixture of benzene and ethyl acetate a total of 1.70 g. of pure amorphous 7α-methyl-estradiol-17-acetate are eluted.

The amorphous compound so obtained is dissolved in a mixture of 4 ml. of dihydropyran and 4 ml. of tetrahydrofuran and, after addition of 0.1 ml. of phosphorus oxychloride, the solution is allowed to stand for 15 minutes with exclusion of moisture. The reaction solution is then poured on to 100 ml. of ice water and 35 ml. of saturated sodium bicarbonate solution, and the mixture extracted with ether. The organic layer is washed neutral with water, dried, and evaporated under a water-jet vacuum. The resulting colorless oil (2.10 g.) is then dissolved in methylene chloride, and filtered through 30 times its weight of alumina (activity I). The resulting $\Delta^{1,3,5(10)}$-3-tetrahydropyranyloxy - 7α - methyl - 17β-acetoxy-estratriene (1.76 g.) shows in the IR spectrum bands inter alia at 5.78, 6.23, 6.71, 8.20, 9.00, 9.74, 9.85 and 10.40μ. It is hydrolyzed without prior purification. To this end it is dissolved in 100 ml. of methanol, treated with a solution of 2.94 g. of potassium carbonate in 10 ml. of water, and the mixture is stirred and boiled for 15 hours under reflux. The reaction mixture is then cooled, poured into 350 ml. of water while stirring vigorously, the crystalline crude product is filtered off with suction, washed with water, dissolved in ether, and the solution shaken once with water, dried, admixed with 3–5 drops of pyridine, and evaporated under a water-jet vacuum. The resulting crude, crystalline $\Delta^{1,3,5(10)}$-3-tetrahydropyranyloxy-7α-methyl - 17β-hydroxy-estratriene (1.52 g.) is dissolved in 15 ml. of acetone, the solution cooled to 0° C., treated, while being stirred and cooled, with 1.3 ml. of an 8 N-chromic acid solution in dilute sulfuric acid and, after about 1 minute, with 3 g. of sodium acetate. The reaction mixture is then diluted with water and ether, the aqueous layer separated, and extracted with ether. The organic solution is washed neutral with ice-cold sodium bicarbonate solution and water, dried, and evaporated under a water-jet vacuum. The resulting crude product yields on recrystallization from methylene chloride+ether and chromatography of the mother liquors a total of 1.10 g. of pure 7α-methyl-estrone-3-tetrahydropyranyl ether of melting point 157–159° C; (IR spectrum: bands, inter alia, at 5.78, 6.24, 6.72, 8.36, 8.93, 9.35, 9.66 and 10.34μ).

A suspension of 385 mg. of the compound obtained in 12 ml. of 70% acetic acid is stirred for 15 minutes while being heated to 60° C. The substance dissolves, and after a short while the product formed begins to precipitate. The mixture is poured onto ice, and extracted with a 4:1 mixture of ether and methylene chloride. The organic layer is washed with ice-cold sodium bicarbonate solution and with saturated sodium chloride solution, dried and evaporated under a water-jet vacuum, to yield 293 mg. of 7α-methyl-estrone which, after being recrystallized from methylene chloride+methanol, melts at 230–231° C; $[α]_D^{20} = +147°$ (c.=1.0).

EXAMPLE 2

To a solution of 250 mg. of lithium in a mixture of 4.6 g. of diphenyl and 25 ml. of tetrahydrofuran are added 0.55 ml. of diphenylmethane and 1 g. of 3-oxo-7α-methyl-17-ethylenedioxy-$\Delta^{1,4}$-androstadiene, which are rinsed in with 5 ml. of tetrahydrofuran. The mixture is boiled and stirred for 2 hours under a current of nitrogen, then cooled with a mixture of ice and methanol, and treated with 2.5 g. of ammonium chloride. The solution discolors. 10 minutes later, it is treated with 7.5 ml. of water and with benzene. It is then washed with a dilute solution of sodium chloride, extracted with benzene, dried, and evaporated under vacuum. The residue is treated with 30 ml. of 90% acetic acid and the flask filled with nitrogen and heated from 60° to 80° C. in the course of 25 minutes. The batch is then evaporated under reduced pressure, and this operation repeated once with benzene. The residue is chromatographed over 30 g. of alumina (activity II). The 7α-methyl-estrone is eluted with benzene. Recrystallization from a mixture of methylene chloride and ether results in 350 g. of the product. It melts at 233–236° C. and its mixed melting point with authentic material shows no lowering, and the IR spectrum is identical with that of authentic material.

EXAMPLE 3

To a suspension, cooled to −10° C., of 2.5 g. of 7α-methyl-estrone in 12 ml. of methanol and 8.5 ml. of methylene chloride is added with stirring in the course of 30 minutes a solution of 1.50 g. of sodium hydroxide in 3.0 ml. of water. In the course of another 90 minutes, 3.60 ml. of dimethyl sulfate are added dropwise to the reaction solution. The mixture is then treated with a solution of 1.80 g. of sodium hydroxide in 4 ml. of water, and immediately afterwards, with 3.0 ml. of dimethylsulfate in the course of 30 minutes. Under a water-jet vacuum, the methylene chloride present is expelled, water is added to the concentrated reaction mixture, which is then cooled. The precipitated product is filtered off, washed with water, dissolved in a 4:1 mixture of ether and methylene chloride, the solution washed neutral with water, dried, and evaporated under a water jet vacuum. There are obtained 2.5 g. of the crude 3-methyl ether of 7α-methyl-estrone (melting at 151–152° C.). Recrystallization from methylene chloride+methanol yields a preparation melting at 161–162° C. IR spectrum: bands, inter alia, at 5.74, 6.20, 6.29, 6.65, 8.10, 8.30, 9.30 and 9.48μ; $[α]_D^{16} = +144° ±2$ (c.=0.477%).

EXAMPLE 4

*Pharmaceutical preparations*

(a) A tablet containing 0.05 mg. of 7α-methyl-estrone to be used as estrogenic preparation

| Ingredients: | Mg. |
|---|---|
| 7α-methyl-estrone | 0.05 |
| Lactose | 60 |
| Wheat starch | 20 |
| Colloidal silicic acid with hydrolysed starch | 5 |
| Talc | 5 |
| Magnesium stearate | 0.5 |
| Arrowroot | 9.45 |
| | 100 |

(b) A tablet containing 0.5 mg. of the 7α-methyl-estrone 3-methyl-ether to be used as estrogenic preparation

| Ingredients: | Mg. |
|---|---|
| 7α-methyl-estrone-3-methyl-ether | 0.5 |
| Lactose | 50 |
| Wheat starch | 30 |
| Gelatine | 1 |
| Talc | 5 |
| Magnesium stearate | 0.5 |
| Arrowroot | 13 |
| | 100 |

*Preparation.*—The mixture of the active ingredients, lactose and wheat starch is moistened with a solution containing the colloidal silicic acid or the gelatine to form a slightly plastic mass and then granulated in the usual manner. After being dried at 40° C., the mass is brought into the usual grain size by being passed through a sieve. Arrowroot, magnesium stearate and talc are added to the dried mass and the mixture is then compressed into tablets of 7 mm. in diameter.

(c) 1000 linguettes each containing 0.05 mg. of 7α-methyl-estrone-3-methyl-ether

| Ingredients: | G. |
|---|---|
| 7α-methyl-estrone-3-methyl-ether | 0.05 |
| Lactose | 100 |
| Saccharose | 229.95 |
| Stearic acid | 3 |
| Talc | 17 |
| | 350 |

*Procedure.*—The mixture of the active substance with lactose is moistened with an aqueous solution of saccharose and granulated in the usual manner. After being dried, the sieved granulate is mixed with stearic acid and talc and then compressed into linguettes.

(d) 100 oil ampoules each containing 0.5 mg./ml. of 7α-methyl-estrone

| Ingredients: | | |
|---|---|---|
| 7α-methyl-estrone | g | 0.05 |
| Benzyl alcohol | ml | 10 |
| Sesame oil, ad. | ml | 100 |

*Procedure.*—The active ingredient is dissolved in benzyl alcohol and the stirred solution diluted with hot sterilized sesame oil. 1 ml. of this solution containing the ingredients in the above given amounts is filled in ampoules which are sterilized at 160° C. for 1.5 hours.

What is claimed is:

1. The 7α-methyl-estrone of the formula

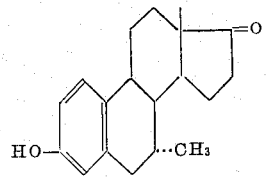

2. The 3-methyl-ether of 7α-methyl-estrone of the formula

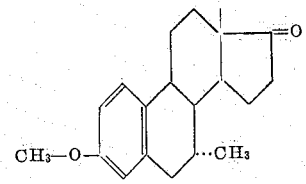

References Cited by the Examiner

UNITED STATES PATENTS 2,584,271   2/1952   Huffman _____ 260—239.55

OTHER REFERENCES

Campbell et al.: "Steroids," volume 1, pages 317 to 324, March 1963.

LEWIS GOTTS, *Primary Examiner.*

H. A. FRENCH, *Assistant Examiner.*